United States Patent [19]

Newby et al.

[11] Patent Number: 6,108,422

[45] Date of Patent: Aug. 22, 2000

[54] CONDITIONAL ACCESS SYSTEM, DOWNLOADING OF CRYPTOGRAPHIC INFORMATION

[75] Inventors: Charles F. Newby, San Diego; Michael V. Harding, Santa Monica, both of Calif.

[73] Assignee: The Titan Corporation, San Diego, Calif.

[21] Appl. No.: 09/103,912

[22] Filed: Jun. 24, 1998

Related U.S. Application Data

[60] Division of application No. 08/646,251, Jun. 24, 1996, Pat. No. 5,796,829, and a continuation-in-part of application No. 08/303,409, Sep. 9, 1994, abandoned.

[51] Int. Cl.[7] .................................................. H04L 9/00
[52] U.S. Cl. .............................................................. 380/47
[58] Field of Search ........................................ 380/21, 47

[56] References Cited

U.S. PATENT DOCUMENTS

| | | |
|---|---|---|
| 4,484,025 | 11/1984 | Ostermann et al. . |
| 4,613,901 | 9/1986 | Gilhousen et al. . |
| 4,712,238 | 12/1987 | Gilhousen et al. . |
| 5,111,504 | 5/1992 | Esserman et al. . |
| 5,138,659 | 8/1992 | Kelkar et al. . |
| 5,144,662 | 9/1992 | Welmer . |
| 5,144,664 | 9/1992 | Esserman et al. . |
| 5,191,611 | 3/1993 | Lang . |
| 5,291,554 | 3/1994 | Morales . |
| 5,321,750 | 6/1994 | Nadan ...................................... 380/20 |
| 5,491,748 | 2/1996 | Auld, Jr. . |
| 5,652,795 | 7/1997 | Dillon et al. . |
| 5,796,829 | 8/1998 | Newby et al. ............................ 380/21 |

OTHER PUBLICATIONS

"Progress on Conditional Access", DVB News, Sep. 1994, p. 1.

"Conditional Access Interface Specification for Digital Video Broadcasting Decoders", Part 1, Draft A. Jul. 29, 1994.

Grand Alliance HDTV System Specification, Version 1.0, Apr. 14, 1994, pp. 5. p. 47–5. p. 52.

"Common Conditional Access Interface Specification for Digital Video Broadcasting Decoder Applications", Draft D., DVP Project Office of European Broadcasting Union, Feb. 2, 1995.

Cutts, "Presentation to NRSS Committee", Sep. 19, 1994.

RENEWSEC (197), Dec. 9, 1994.

*Primary Examiner*—Salvatore Cangialosi
*Attorney, Agent, or Firm*—Edward W. Callan

[57] ABSTRACT

An access control processor for a conditional access system. The processor includes a decryptor in an information receiver for decrypting encrypted information segments received by the information receiver by processing the received encrypted information segments with a session key used for encrypting the information segments in accordance with an algorithm utilized in a conditional access processes; and a conditional access controller in the information receiver for selectively enabling the decryptor to decrypt received information segments encrypted in accordance with the conditional access processes by providing to the decryptor cryptographic information for defining the algorithm utilized in the conditional access process for use by the decryptor to decrypt the received information segment encrypted in accordance with said algorithm. Algorithm-defining cryptographic information is downloaded from an information stream received by the information receiver. Transmission of the cryptographic information for enabling the conditional access controller to enable the decryptor to decrypt a selected information segment may be requested by the conditional access controller and downloaded to the conditional access controller from an information stream received by the information receiver. Computer readable storage media are so configured as to cause the access control processor to perform its various functions.

7 Claims, 4 Drawing Sheets

CONDITIONAL ACCESS SYSTEM, DOWNLOADING OF CRYPTOGRAPHIC INFORMATION

CROSS-REFERENCE TO RELATED APPLICATION

This is a division of application Ser. No. 08/646,251, which was filed Jun. 24, 1996, now U.S. Pat. No. 5,796,829, and a continuation-in-part of application Ser. No. 08/303,409 filed Sep. 9, 1994, now abandoned.

BACKGROUND OF THE INVENTION

The present invention pertains to systems and methods for securely controlling access to information segments distributed to information receivers in a point-to-point or point-to-multi-point network. Such systems are known as conditional access systems. The information may include video, audio, text, data and any/or other type of information that may be subject to conditional access. An information segment is a given block of information, such as a television program, a given block of text or a given block of data, that typically is transmitted over a relatively short duration.

In the prior art, encrypted information segments respectively provided by a plurality of different conditional access information service providers are respectively encrypted for transmission in accordance with different conditional access processes, which may respectively utilize different algorithms for encrypting the information segments; and the differently encrypted information segments are respectively decrypted by differently configured information receivers respectively containing access control processors adapted for enabling decryption of only encrypted information segments encrypted in accordance with one of the different conditional access processes. An encryption algorithm is a process by which a given signal is processed with a key (signal) to transform the given signal into an encrypted signal that is unintelligible or by which the given signal can be recovered by corresponding processing of the encrypted signal with a corresponding key. The parameters of an encryption algorithm determine the order of selection for processing of bits in the given signal, the key and intermediate signals produced by such processing, and the sequence of such processing.

An exemplary prior art conditional access system is described in U.S. Pat. No. 4,631,901 to Klein S. Gilhousen, Charles F. Newby and Karl E. Moerder and U.S. Pat. No. 4,712,238 to Klein S. Gilhousen, Jerrold A. Heller, Michael V. Harding and Robert D. Blakeney. In such conditional access system, an information segment is encrypted for transmission by scrambling the information segment with a keystream that is produced by processing a secure session key in accordance with a predetermined encryption algorithm, such as the DES encryption algorithm. In an information receiver of such a conditional access system, the encrypted information signal is decrypted by descrambling the encrypted information segment with a keystream that is produced by processing the secure session key in accordance with the predetermined encryption algorithm. The session key is a key that is processed to produce the keystream that is used to scramble an information segment for a given transmission of the encrypted information segment. Typically the session key is processed with another key and/or a data signal to produce the keystream. In the two above-cited patents, the session key is referred to as a channel key.

SUMMARY OF THE INVENTION

The present invention provides an access control processor for a conditional access system in which an encrypted information segment provided by an information service provider is encrypted for transmission in accordance with a conditional access process utilizing an algorithm for encrypting the information segment, the processor comprising a decryptor in an information receiver for decrypting encrypted information segments received by the information receiver by processing the received encrypted information segments with a session key used for encrypting the information segments in accordance with an algorithm utilized in said conditional access process; and a conditional access controller in the information receiver for enabling the decryptor to decrypt received information segments encrypted in accordance with said conditional access process by providing to the decryptor cryptographic information for defining the algorithm utilized in said conditional access process for use by the decryptor to decrypt the received information segments encrypted in accordance with said algorithm, wherein the conditional access controller includes means for detecting within an information stream received by the information receiver cryptographic information for defining the algorithm used for encrypting information segments in accordance with said conditional access process; and means for downloading the detected cryptographic information from said information stream.

In a further aspect, the present invention provides an access control processor for a conditional access system in which an encrypted information segment provided by an information service provider is encrypted for transmission in accordance with a given conditional access process, the processor comprising a decryptor in an information receiver for decrypting encrypted information segments received by the information receiver; a conditional access controller in the information receiver for enabling the decryptor to decrypt a selected received information segment encrypted in accordance with the given conditional access process; and means for processing an authorization signal related to the selected information segment to determine whether or not the decryptor is enabled to decrypt the selected information segment and to determine which of a plurality of different possible authorization statuses is applicable to the selected information segment; wherein the conditional access controller includes means for retrieving from a plurality of different possible authorization status messages within an information stream received by the information receiver a message applicable to the status determined by said processing; and means for providing the retrieved message for display.

The present invention further provides a conditional access system including the immediately-above-described access control processor in combination with encryption means for encrypting an information segment for transmission in accordance with a given conditional access process.

The present invention also provides computer readable storage media for use in an access control processor, which storage media are respectively so configured as to cause the access control processors to perform various functions of the above-described access control processors of the present invention.

The present invention further provides the methods that are carried out by the above-described access control processors and conditional access systems.

Additional features of the present invention are described with reference to the detailed description of the preferred embodiments.

DETAILED DESCRIPTION

Figure 1:
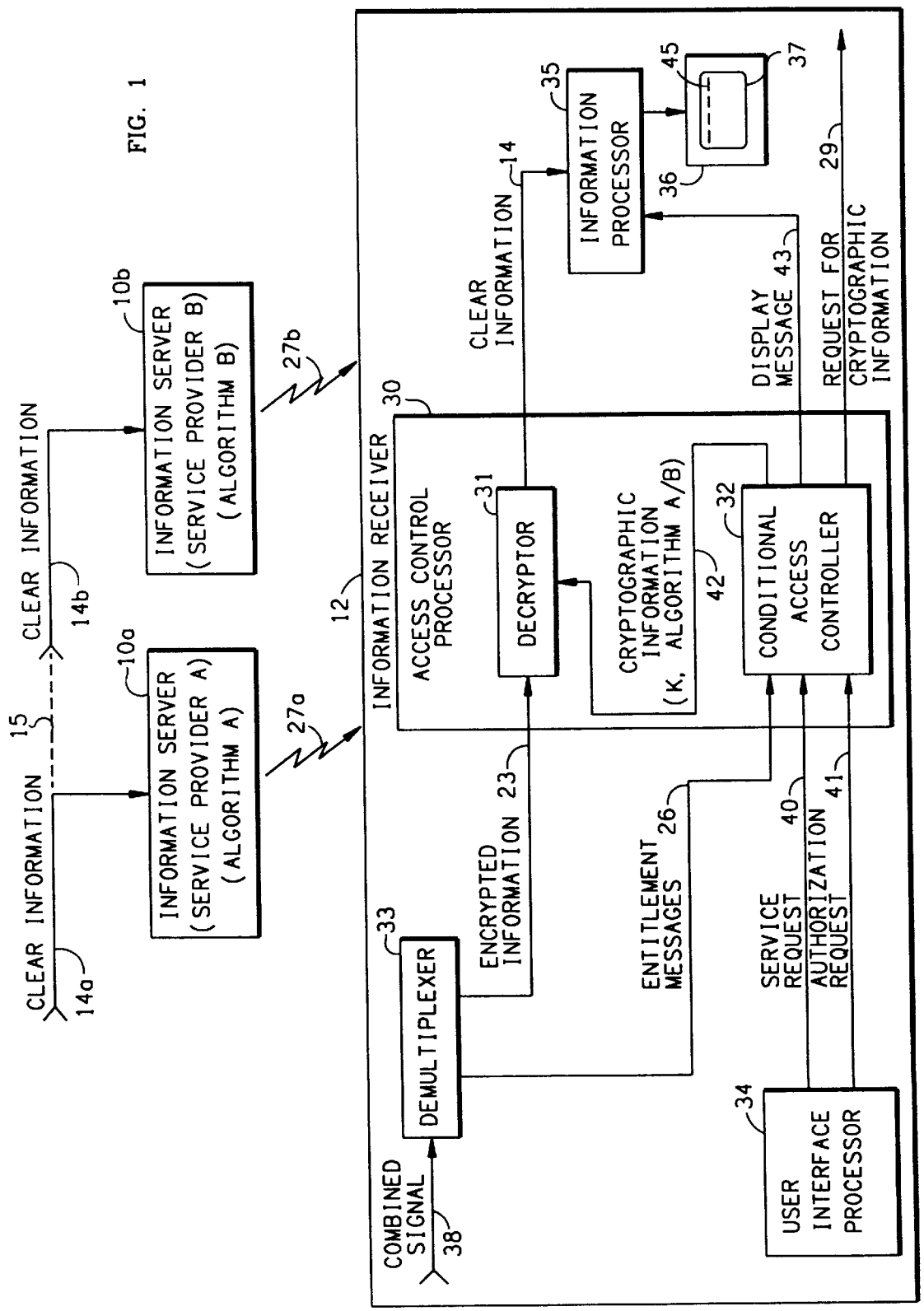
FIG. 1 is a block diagram of a preferred embodiment of a conditional access system according to the present invention.

Referring to FIG. 1, a preferred embodiment of a conditional access system according to the present invention includes a plurality of information servers 10a, 10b and one preferred embodiment of an information receiver 12. The information servers 10a, 10b may be separately located or they may be included in a distribution hub that receives information segments 14a, 14b transmitted from different sources and encrypts the information segments for further transmission. The information receiver 12 may be an end-user information receiver or included in a distribution hub that receives information segments 14a, 14b transmitted from different sources and encrypts the information segments for further transmission.

A first information server 10a encrypts clear information segments 14a provided by a first information service provider A for transmission in accordance with a first conditional access processes utilizing a first algorithm A for encrypting information segments 14a; and a second information server 10b encrypts clear information segments 14b provided by a second information service provider B for transmission in accordance with a second conditional access processes utilizing a second algorithm B for encrypting the information segments 14b. The first conditional access process is different from the second conditional access process and the first algorithm A is different from the second algorithm B. As indicated by the dashed line 15, the clear information segments 14a may be the same as the clear information segments 14b; but usually the clear information segments 14a are different from the clear information segments 14b.

Figure 2:
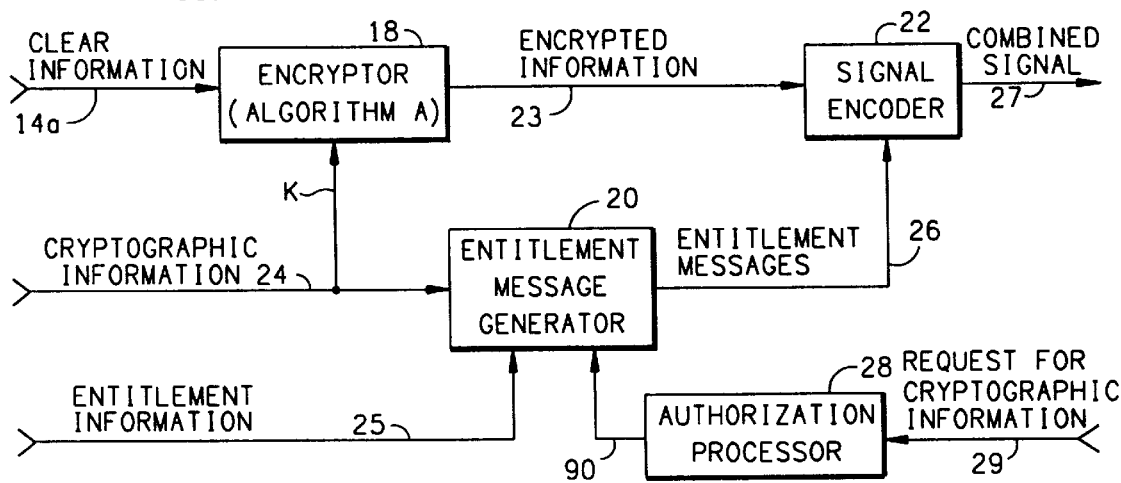
FIG. 2 is a block diagram of an information server in the system of FIG. 1.

Referring to FIG. 2, a preferred embodiment of the information server 10a includes an encryptor 18, an entitlement message generator 20, a signal encoder 22 and an authorization processor 28.

The encryptor 18 encrypts the clear information segments 14a by processing the information segments 14a with a session key K in accordance with the first algorithm A utilized in the first conditional access process to provide encrypted information segments 23. The session key K is included in cryptographic information 24 that is processed by the entitlement message generator 20 with entitlement information 25 to provide entitlement messages 26. The encoder 22 combines the encrypted information segments 23 and entitlement messages 26 to provide a combined signal 27 for transmission. Examples of entitlement information are described in the aforementioned U.S. Pat. No. 4,712,238 as the program mask, the program cost, the credit signal and the authorization word. Examples of cryptographic information as described in said patent, include the channel key (session key), the category key and the subscriber key generation number. Examples of entitlement messages, as described in said patent include the channel rekey message and the category rekey message. Transmission of the combined signal 27 may be accomplished by communication satellite, microwave, cable, telephone and/or land lines.

The operation of the authorization processor 28 and the entitlement message generator 20 in response to a request for cryptographic information signal 29 is described below with reference to an alternative embodiment feature of the conditional access controller shown in FIG. 4.

Referring again to FIG. 1, one preferred embodiment of an information receiver 12 for use in a conditional access system according to the present invention includes an access control processor 30 including a decryptor 31 and a conditional access controller 32, a demultiplexer 33, a user interface processor 34, an information processor 35 and an information output device 36, such as a television set, having a video monitor 37 and/or an audio speaker (not shown). Alternatively, or additionally, the information output device 36 may include such other components as a personal computer, a printer, and or a video cassette recorder. The decryptor 31, or a portion thereof, may be embodied in a replaceable security element, such as a smart card (not shown).

The demultiplexer 33 demultiplexes a received combined signal 38 containing encrypted information segments and entitlement messages and provides the received encrypted information segments 23 to the decryptor 31 and the received entitlement messages 26 to the conditional access controller 32.

The user interface processor 34 responds to inputs (not shown) initiated by a user of the information receiver 12 by providing either an service request signal 40 or an authorization request signal 41 to the conditional access controller 32.

The conditional access controller 32 processes the entitlement messages 26 to determine whether the decryptor 31 in the information receiver 12 is authorized to decrypt encrypted information segments 23 identified by the service request signal 40. Upon determining that the decryptor 31 and thereby the information receiver 12 is so authorized, the conditional access controller 32 provides appropriate cryptographic information 42 to the decryptor 31 to thereby enable the decryptor 31 to decrypt the received encrypted information segments 23. The cryptographic information 42 includes the session key K and cryptographic data for defining the algorithm A or B utilized in the conditional access process used to produce the encrypted information segments 23 identified by the service request signal 40.

The decryptor 31 then decrypts the received encrypted information segments 23 by processing the received encrypted information segments 23 with the session key K used for encrypting the information segments in accordance with the algorithm A or B utilized in the conditional access process used to produce the encrypted information segments 23, to thereby reproduce the clear information segments 14, which are provided to the information processor 35.

Upon determining the authorization status of the information receiver 12, the conditional access controller 32 causes a status message 43 applicable to the determined authorization status to be provided to the information processor 35 for display by the video monitor 37 of the information output device 36.

The information processor 35 processes the clear information segments 14 to cause the output device 36 to provide an output to the user of the information receiver 12. When the clear information segments 14 represent a television signal, the output device 36 causes a picture to be provided on a video monitor 37 and also provides an audio output signal to the speaker in the information output device 36. When the clear information segments 14 represent text and/or data, the information processor 35 causes the text and/or data to be displayed on the video monitor 37 and may also cause such text and/or data to be printed out by a printer (not shown) coupled to the information processor 35. Such clear information 14 representing text and/or data may be stored initially in a memory (not shown) for later processing by the information processor 35.

The information processor 35 processes the status message 43 to cause the output device 36 to display the message 45 to the user of the information receiver 12 on the video monitor 37. The information processor 35 may process the status message 43 together with the clear information segments 14 in such a manner as to cause the displayed message 45 to be superimposed over a picture provided on the video monitor in response to processing of the clear information segments 14. Alternatively, the information processor 35 may give priority to processing of the status message 43 and supersede any display of a picture in response to processing of the clear information segments 14 by causing only the displayed message 45 to be displayed on the video monitor 37 for a short duration.

Figure 3:
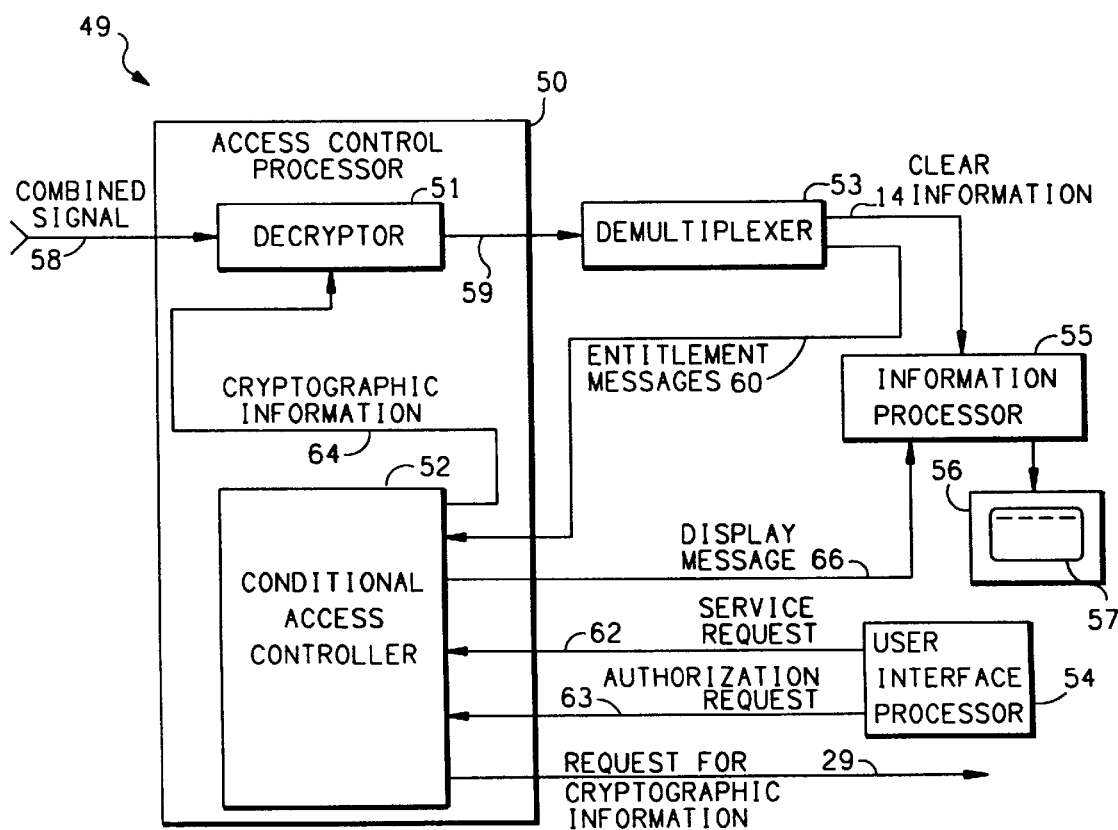
FIG. 3 is a block diagram of an alternative preferred embodiment of the information receiver in the system of FIG. 1.

Referring to FIG. 3, an alternative embodiment of an information receiver 49 for use in the conditional access system of the present invention includes an access control processor 50 including a decryptor 51 and a conditional access controller 52, a demultiplexer 53, a user interface processor 54, an information processor 55 and an information output device 56, such as a television set, having a video monitor 57 and/or an audio speaker (not shown). The decryptor 51, or a portion thereof may be embodied in a replaceable security element, such as a smart card (not shown).

The decryptor 51 receives a combined signal 58 containing encrypted information segments and entitlement messages.

The demultiplexer 53 is coupled to the decryptor 51 and demultiplexes the combined signal 59 from the decryptor 51 containing information segments and entitlement messages and provides the received information segments 14 to the information processor 55 and the received entitlement messages 60 to the conditional access controller 52.

Until the decryptor 51 is enabled for decryption, the combined signal 59 provided from the decryptor 51 to the demultiplexer 53 includes encrypted information segments.

The user interface processor 54 responds to inputs (not shown) initiated by a user of the information receiver 49 by providing either an service request signal 62 or an authorization request signal 63 to the conditional access controller 52.

The conditional access controller 52 processes the entitlement messages 60 to determine whether the decryptor 51 in the information receiver 49 is authorized to decrypt encrypted information segments identified by the service request signal 62. Upon determining that the decryptor 51 and thereby the information receiver 49 is so authorized, the conditional access controller 52 provides appropriate cryptographic information 64 to the decryptor 51 to thereby enable the decryptor 51 to decrypt the received encrypted information segments included in the received combined signal 58. The cryptographic information 64 includes the session key K and cryptographic data for defining the algorithm A or B utilized in the conditional access process used to produce the encrypted information segments identified by the service request signal 62. Since the combined signals 27a provided by the information server 10a of information service provider A may incorporate the encrypted information segments into the combined signal 27a in a different format than the format used for such purpose by the information server 10b of information service provider B, the cryptographic information 64 provided to the decryptor 51 by the conditional access controller 52 further includes format data that enables the decryptor 51 to decrypt only the encrypted information segments included in the combined signal 58.

After the decryptor 51 has been enabled for decryption, the combined signal 59 provided from the decryptor 51 to the demultiplexer 53 includes clear information segments rather than encrypted information segments.

The decryptor 51 decrypts the received encrypted information segments in the combined signal 58 by processing the received encrypted information segments with the session key K used for encrypting the information segments in accordance with the algorithm A or B utilized in the conditional access process used to produce the encrypted information segments, to thereby reproduce the clear information segments 14, which are provided by the multiplexer 53 to the information processor 55.

Upon determining the authorization status of the information receiver 49, the conditional access controller 52 causes a status message 66 applicable to the determined authorization status to be provided to the information processor 55 for display by the video monitor 57 of the information output device 56.

The information processor 55 processes the clear information segments 14 and the status message 66 to cause the output device 56 to provide an output to the user of the information receiver 49 in the same manner as described above with reference to the information processor 35 and the output display device 36 of the information receiver 12 shown in FIG. 1.

Figure 4:
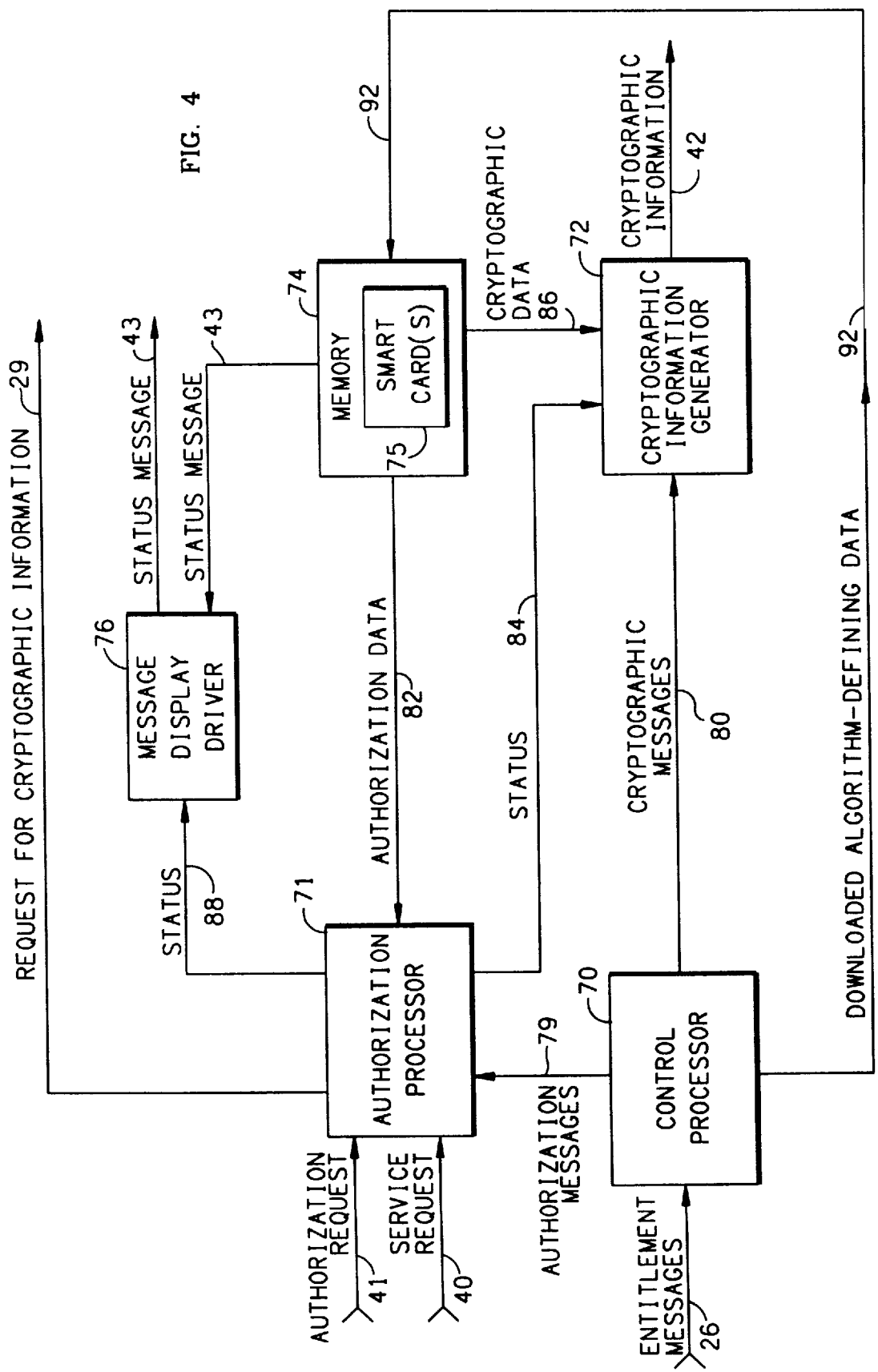
FIG. 4 is block diagram of one preferred embodiment of the conditional access controller in the systems of FIGS. 1 and 3.

Referring to FIG. 4, the conditional access controller 32, 52 of either the information receiver 12 shown in FIG. 1 or the information receiver 49 shown in FIG. 3 includes a control processor 70, an authorization processor 71, a cryptographic information generator 72, a memory 74 preferably including one or more smart cards 75, and a message display driver 76. The cryptographic information generator 72, or a portion thereof, may be embodied in a replaceable security element, such as a smart card (not shown). In one embodiment, a portion of the memory 74, a portion of the cryptographic information generator 72 and a portion of the decryptor 31 are embodied in a common replaceable security element, such as a smart card (not shown). In describing the conditional access controller shown in FIG. 4, only the reference numerals shown in FIG. 1 are used to refer to the various signals and components that are shown in both FIGS. 1 and 3, although the corresponding reference numerals shown in FIG. 3 for such signals and components also are applicable.

The control processor 70 processes the entitlement messages 26 to provide authorization messages 79 to the authorization processor 71 and cryptographic messages 80 to the cryptographic information generator 72.

The authorization processor 71 responds to an service request signal 40 by processing the authorization messages 79 with authorization data 82 stored in the memory 74 to determine whether the decryptor 31 in the information receiver is authorized to decrypt encrypted information segments identified by the service request signal 40. Upon determining that the decryptor 31 and thereby the information receiver is so authorized, the authorization processor 71 provides an appropriate status signal 84 to the cryptographic information generator 72. An example of an authorization processor is described in the aforementioned U.S. Pat. No. 4,712,238 with reference to FIG. 1. In the conditional access controller of FIG. 4, the status signal 84 includes both an enable signal and data identifying either conditional access process A or conditional access process B as the conditional access process used for encrypting the information segment identified in the service request signal 40.

The cryptographic information generator 72 responds to the status signal 84 by processing the cryptographic messages 80 together with cryptographic data 86 retrieved from the memory 74 to thereby provide to the decryptor 31 the cryptographic information 42 that enables the decryptor 31 to decrypt the received encrypted information segments 23 identified by the service request signal 40. As indicated above, the cryptographic information 42 includes the session key K and cryptographic information for defining the algorithm A or B utilized in the conditional access process used to produce the encrypted information segments identified by the service request signal 40.

The data for defining algorithm A or B included in the cryptographic information 42 is retrieved from the memory 74 as part of the cryptographic data 86 utilized in accordance with the conditional access process A or B identified in the status signal 84 as the conditional access process used for encrypting the information segment identified in the service request signal 40. In one embodiment, the memory 74 stores the cryptographic information for defining the different algorithms A and B respectively used in the different conditional access processes. In another embodiment the cryptographic information for defining each algorithm A, B is stored in a separate replaceable security element, such as the smart card 75 and is provided therefrom to the cryptographic information generator 72. The memory 74 may include a plurality of such smart cards 75 respectively provided by the different conditional access information service providers and respectively storing the cryptographic information for defining the different algorithms A, B utilized for decrypting the received encrypted information segments 23 in accordance with the different conditional access processes A and B.

When the service request signal 40 identifies a selected information segment that is provided by each of a plurality of different service providers, the authorization processor 71 processes authorization signals in the authorization messages 79 related to the selected information segment provided by each of the plurality of the different service providers to determine which of a plurality of different possible authorization statuses is applicable to the selected information segment provided by each of the service providers; and selects for decryption in accordance with a predetermined priority based upon such status determinations the encrypted information segment provided by one of the service providers. Examples of different statuses include, in order or priority: "blacked-out", "locked-out", "authorized", "available for pay-for-view" and "not presently authorized". The conditional access process A or B used by the service provider for encrypting the information segment selected in accordance with such predetermined priority is identified in the status signal 84 provided to the cryptographic information generator 72 so as to cause the cryptographic generator 72 to include in the cryptographic information 42 the cryptographic information for defining the algorithm used for encrypting the selected information segment provided by such service provider. Such predetermined priority may be changed from time to time by downloading new priority data from the information stream received by the information receiver 12, 49 or from a new smart card inserted into the memory 74.

The status determined by the authorization processor 71 is indicated by a status signal 88 provided by the authorization processor 71 to the message display driver 76, which in turn retrieves a status message 43 corresponding to the indicated status from the memory 74 and provides the status message 43 to the information processor 35. The user of the information receiver is informed of the determined status by the status message display 45 on the video monitor 37. The status signals 84, 88 and the display 45 of the status are provided in response to each service request signal 40 notwithstanding whether the selected information segment is provided by one or more different service providers.

When the status is "not presently authorized", the user may operate the user interface processor 34 to provide an authorization request signal 41 to the authorization processor 71. The authorization processor 71 responds to the authorization request signal 41 by generating a request for cryptographic information signal 29 that is transmitted to the information server 10a, 10b of the service provider that provides the selected information segment identified in the service request signal 40. The request for cryptographic information signal 29 is a request for transmission to the information receiver of cryptographic information for enabling the conditional access controller 32 to enable the decryptor 31 to decrypt the selected information segment identified in the service request signal 40.

The authorization processor 28 in the information server 10a receives and processes the request for cryptographic information signal 29 to determine whether or not the information receiver from which the request signal 29 originated should be authorized to decrypt the selected information segment Upon determining that such information receiver should be so authorized, the authorization processor 28 causes the requested cryptographic information 90 to be included in entitlement messages 26 provided by the entitlement message generator 20 that are addressed to the information receiver from which the request signal 29 originated, together with authorization messages 79 that will cause the authorization processor 71 in the information receiver to determine that the decryptor 31 in the information receiver is authorized to decrypt the selected encrypted information segment. If the cryptographic information generator 72 is of the type described in the aforementioned U.S. Pat. No. 4,712,238, at least some of the key seed(s) stored in the memory 74 of the information receiver would have to be known to the information service provider providing such authorization.

In the conditional access controller 32 of the information receiver, the control processor 70 downloads cryptographic information transmitted to the information receiver in response to the request for cryptographic information signal 29 by detecting the transmitted cryptographic information within an information stream of entitlement messages 26 received by the information receiver and by downloading the detected cryptographic information from such information stream.

The transmitted cryptographic information downloaded by the control processor 70 includes cryptographic data 92 for defining the algorithm that is used in the conditional access process utilized by the information server 10a, 10b that encrypts the selected encrypted information segment and cryptographic data for use in generating a session key for use by the decryptor 32 for decrypting information segments encrypted in accordance with the given conditional access process, including data for defining an algorithm for generating the session key and cryptographic information of the type that typically is provided to information receivers in the rekey messages. The transmitted cryptographic information may be encrypted for transmission in order to enhance security, in which case the control processor 70 includes a decryptor (not shown) for decrypting the transmitted cryptographic information. Also data for defining a new encryption algorithm as well as other cryptographic information may be transmitted at the instigation of the conditional access information service provider rather than in response to a request signal 29 whenever it is desired to change the encryption algorithm or such other cryptographic information.

The downloaded algorithm-defining data 92 is stored in the memory 74 for retrieval by the cryptographic information generator 72 when the authorization processor provides a status signal 84 identifying the conditional access process that utilizes the downloaded algorithm-defining data 92. The remainder of the downloaded cryptographic information is included in the cryptographic messages 80 provided by the control processor 70 to the cryptographic information generator 72 and processed by the cryptographic information generator 72 to generate the session key K included in the cryptographic information 42 provided to the decryptor 31.

Alternatively, the cryptographic information, including the algorithm-defining data required for decrypting encrypted information signals encrypted in accordance with a conditional access process of a given information server can be downloaded into the memory 74 from a smart card 75 sent to the user of the information receiver. This technique of downloading the required algorithm-defining data can be used whenever the algorithm utilized by a given information server 10a, 10b is changed or when a user of an information receiver newly becomes a subscriber to information services provided by the information service provider that operates the information server that utilizes the algorithm defined by such downloaded algorithm-defining data.

Figure 5:
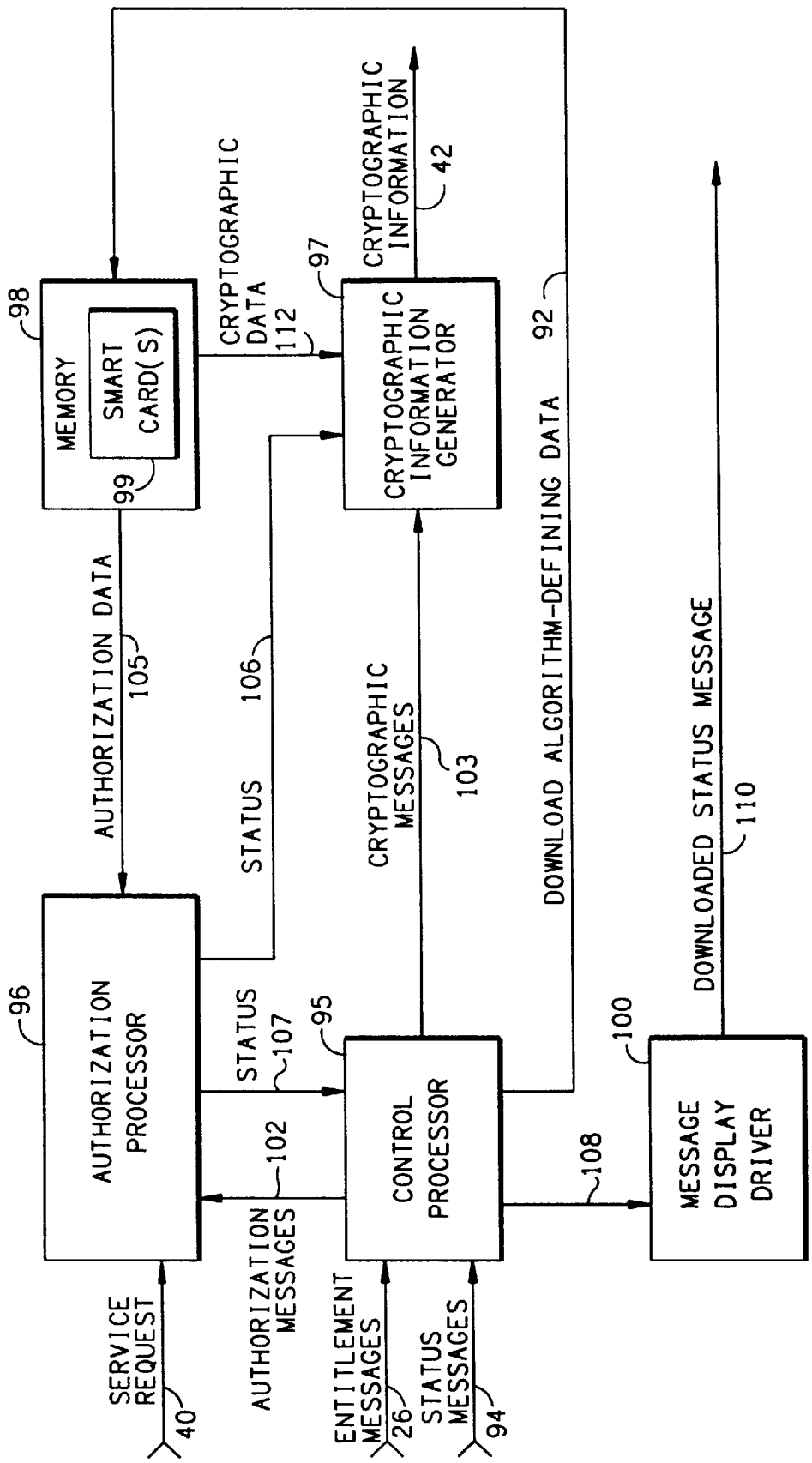
FIG. 5 is a block diagram of another preferred embodiment of the conditional access controller in the systems of FIGS. 1 and 3.

Referring to FIG. 5, an alternative preferred embodiment of the conditional access controller 32, 52 is provided for a conditional access system in which the combined signal 27a 27b, transmitted to the information receiver 12, 49 includes all of the possible status messages 94 in addition to the entitlement messages 26 and the encrypted information segments 23. In this embodiment, the conditional access controller 32, 52 includes a control processor 95, an authorization processor 96, a cryptographic information generator 97, a memory 98 preferably including one or more smart cards 99, and a message display driver 100.

The control processor 95 processes the entitlement messages 26 to provide authorization messages 102 to the authorization processor 95 and cryptographic messages 103 to the cryptographic information generator 97.

The authorization processor 96 responds to an service request signal 40 identifying a selected information segment by processing an authorization signal within the authorization messages 102 that is related to the selected information segment with authorization data 105 stored in the memory 98 to determine whether or not the decryptor 31 is enabled to decrypt the selected information segment and to determine which of a plurality of different possible authorization statuses is applicable to the selected information segment. Upon determining the authorization status of the information receiver, the authorization processor 96 provides a first status signal 106 to the cryptographic information generator 97 and a second status signal 107 to the control processor 95.

The control processor 95 responds to the status signal 107 by retrieving from a plurality of different possible authorization status messages 94 within an information stream received by the information receiver a message 108 applicable to the status determined by the authorization processor 96, as indicated by the status signal 107. The control processor 95 retrieves the applicable status message from the information steam by detecting the applicable status message 108 within the different possible authorization status messages 94 and by downloading the detected applicable status message 108 from said information stream. The control processor 95 provides the downloaded retrieved status message 108 to the message display driver 100, which in turn provides the downloaded status message 110 to the information processor 35 for display by the information output device 36.

The cryptographic information generator 97 responds to the status signal 106 by processing the cryptographic messages 103 together with cryptographic data 112 retrieved from the memory 98 to thereby provide to the decryptor 31 the cryptographic information 42 that enables the decryptor 31 to decrypt the received encrypted information segments 23 identified by the service request signal 40.

Except for the downloading and provision of the status message 108 that is to be displayed, the functions of the components of the conditional access controller of FIG. 5 are the same as the functions of the like components in the conditional access controller of FIG. 4, including the downloading of the cryptographic information from the information stream.

The memory 74, 98 includes computer readable storage media (or medium) that are configured so as the cause the access control processor 30, 50 to perform its various functions described above.

The information segments 14a, 14b that are encrypted may include an MPEG-2 video signal. MPEG-2 is an ISO (International Standards Organization) standard provided by Moving Picture Expert Group Number 2 for television compression and decompression equipment. The information processor 35, 55 may be a MPEG decompressor.

The present invention affords availability to a set-top, such as a digital entertainment terminal, of a network interface module that can through a conditional access/ encryption algorithm-defining data downloading process from the information distribution network gateway equipment, accommodate and run the decryption algorithms of the conditional access system service provider selected by the information provider. Hence each conditional access service provider can customize its own conditional access algorithms, including the information segment encryption algorithm. Accordingly the required integrated circuit sets in a present day proprietary network interface module are replaced by the access control processor of the present invention. A network interface module including the access control processor of the present invention does not depend upon a fixed access control process or a fixed security algorithm architecture for the security provided to the information provider, such as a programmer, but instead provides a flexible crypto-system architecture that through its use of flexible algorithm information stream encryption equipment, flexible message protocol standard, and/or a high-security yet low-cost smart card, responds economically to any security breach, since algorithms are easily changed to offset gains pirates may have made by breaking the code of a particular encryption algorithm.

The present invention also provides mobility to a subscriber owning an information receiver in that the subscriber's entitlements can be carried from set-top to set-top through the simple issuance of a new smart card, one that is matched to the information provider in the information provider's new service area.

The use of a smart card, in addition to the provision of mobility and an enhanced level of flexibility to the marketing of services, special programming, ease of maintenance, ease of update, etc, also provides an enhanced level of security through the timed elements of validity and the personalization of the cards upon a subscriber subscribing for the services.

The present invention also will allow the service providers to have maximum flexibility for purchase of multi-vendor equipment and multi-vendor encryption systems with lower prices derived from open competition.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. An access control processor for a conditional access system in which an encrypted information segment provided by an information service provider is encrypted for transmission in accordance with a conditional access process utilizing an algorithm for encrypting the information segment, the processor comprising a decryptor in an information receiver for decrypting encrypted information segments received by the information receiver by processing the received encrypted information segments with a session key used for encrypting the information segments in accordance with the algorithm utilized in said conditional access process; and a conditional access controller in the information receiver for enabling the decryptor to decrypt received information segments encrypted in accordance with said conditional access process by providing to the decryptor cryptographic information for defining the algorithm utilized in said conditional access process for use by the decryptor to decrypt the received information segments encrypted in accordance with said algorithm, wherein the conditional access controller includes means for detecting within an information stream received by the information receiver cryptographic information for defining the algorithm used for encrypting information segments in accordance with said conditional access process; and means for downloading the detected cryptographic information from said information stream.

2. A computer readable storage medium for use in an access control processor included in an information receiver of a conditional access system in which encrypted information segments provided by an information service provider are encrypted for transmission in accordance with a conditional access process utilizing an algorithm for encrypting the information segments, and including a decryptor for decrypting encrypted information segments received by the information receiver by processing the received encrypted information segments with a session key used for encrypting the information segments in accordance with the algorithm utilized in said conditional access process; and a conditional access controller, wherein the storage medium is configured so as the cause the conditional access controller to enable the decryptor to decrypt received information segments encrypted in accordance with said conditional access process by providing to the decryptor cryptographic information for defining the algorithm utilized in said conditional access process for use by the decryptor to decrypt the received information segment encrypted in accordance with said algorithm, by causing the conditional access controller to detect within an information stream received by the information receiver cryptographic information for defining the algorithm used for encrypting information segments in accordance with said conditional access process and to download the detected cryptographic information from said information stream.

3. A conditional access method in which encrypted information is provided by an information service provider in accordance with a conditional access processes utilizing an algorithm for encrypting the information, comprising the steps of:

(a) using a decryptor in an information receiver to decrypt encrypted information segments received by the information receiver by processing the received encrypted information segments with a session key used for encrypting the information segments in accordance with the algorithm utilized in said conditional access process; and (b) in the information receiver, enabling the decryptor to decrypt received information segments encrypted in accordance with said conditional access process by providing to the decryptor cryptographic information for defining the algorithm utilized in said conditional access process for use by the decryptor to decrypt the received information segment encrypted in accordance with said algorithm, wherein step (b) comprises the steps of:

(c) detecting within an information stream received by the information receiver cryptographic information for defining the algorithm used for encrypting information segments in accordance with said conditional access process; and (d) downloading the detected cryptographic information from said information stream.

4. An access control processor for a conditional access system in which an encrypted information segment provided by an information service provider is encrypted for transmission in accordance with a given conditional access process, the processor comprising a decryptor in an information receiver for decrypting encrypted information segments received by the information receiver;

a conditional access controller in the information receiver for enabling the decryptor to decrypt a selected received information segment encrypted in accordance with the given conditional access process; and means for processing an authorization signal related to the selected information segment to determine whether or not the decryptor is enabled to decrypt the selected information segment and to determine which of a plurality of different possible authorization statuses is applicable to the selected information segment;

wherein the conditional access controller includes means for retrieving from a plurality of different possible authorization status messages within an information stream received by the information receiver a message applicable to the status determined by said processing; and means for providing the retrieved message for display.

5. A conditional access system in which encrypted information is provided by a an information service provider in accordance with a given conditional access process, comprising encryption means for encrypting an information segment for transmission in accordance with a given conditional access process;

a decryptor in an information receiver for decrypting encrypted information segments received by the information receiver;

a conditional access controller in the information receiver for enabling the decryptor to decrypt a selected received information segment encrypted in accordance with the given conditional access process; and means for processing an authorization signal related to the selected information segment to determine whether or not the decryptor is enabled to decrypt the selected information segment and to determine which of a plurality of different possible authorization statuses is applicable to the selected information segment;

wherein the conditional access controller includes means for retrieving from a plurality of different possible authorization status messages within an information stream received by the information receiver a message applicable to the status determined by said processing; and means for providing the retrieved message for display.

6. A computer readable storage medium for use in an access control processor included in an information receiver of a conditional access system in which an encrypted information segment provided by an information service provider is encrypted for transmission in accordance with a given conditional access process, and including a decryptor and a conditional access controller, wherein the storage medium is configured so as to cause the conditional access controller to enable the decryptor to decrypt a selected received information segments encrypted in accordance with the given conditional access process, to cause the access control processor to process an authorization signal related to the selected information segment to determine whether or not decryption of the selected information segment is enabled and to determine which of a plurality of different possible authorization statuses is applicable to the selected information segment, and to cause the conditional access controller to retrieve from a plurality of different possible authorization status messages within an information stream received by the information receiver a message applicable to the status determined by said processing; and to provide the retrieved message for display.

7. A conditional access method in which encrypted information is provided by a an information service provider in accordance with a given conditional access process, comprising the steps of:

(a) encrypting an information segment for transmission in accordance with a given conditional access process;

(b) using a decryptor in an information receiver to decrypt encrypted information segments received by the information receiver;

(c) in the information receiver, enabling the decryptor to decrypt a selected received information segment encrypted in accordance with the given conditional access process; and (d) processing an authorization signal related to the selected information segment to determine whether or not decryption of the selected information segment is enabled and to determine which of a plurality of different possible authorization statuses is applicable to the selected information segment;

wherein step (c) includes the steps of:

(e) retrieving from a plurality of different possible authorization status messages within an information stream received by the information receiver a message applicable to the status determined by said processing; and (f) providing the retrieved message for display.

* * * * *